Nov. 6, 1928.  1,690,919
D. E. BAINE
MEASURING DEVICE
Filed June 1, 1927
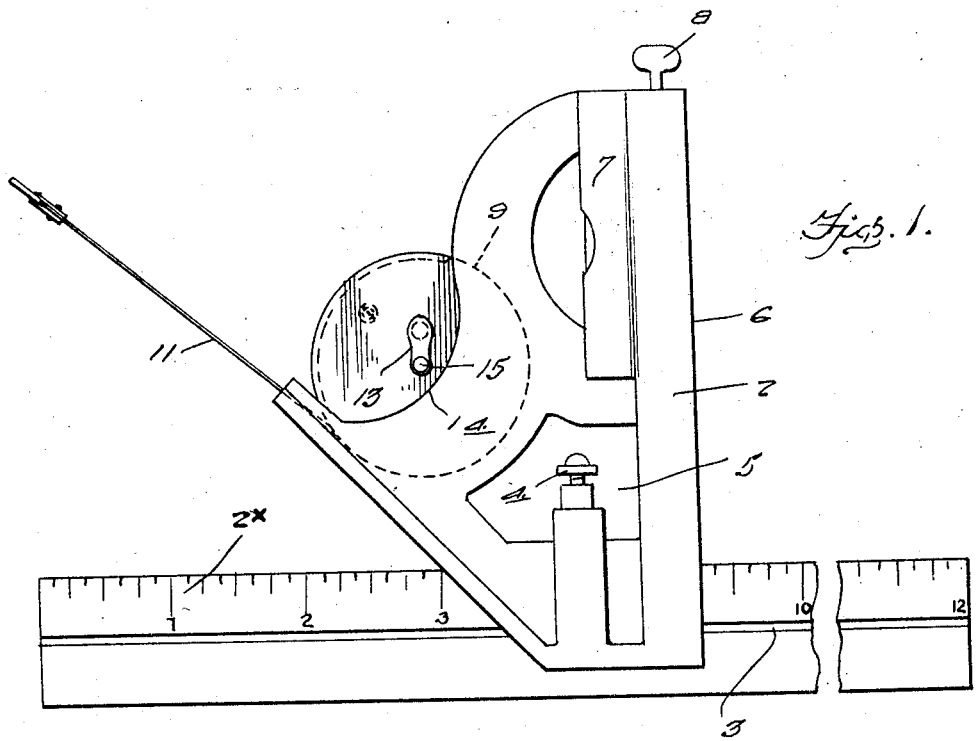
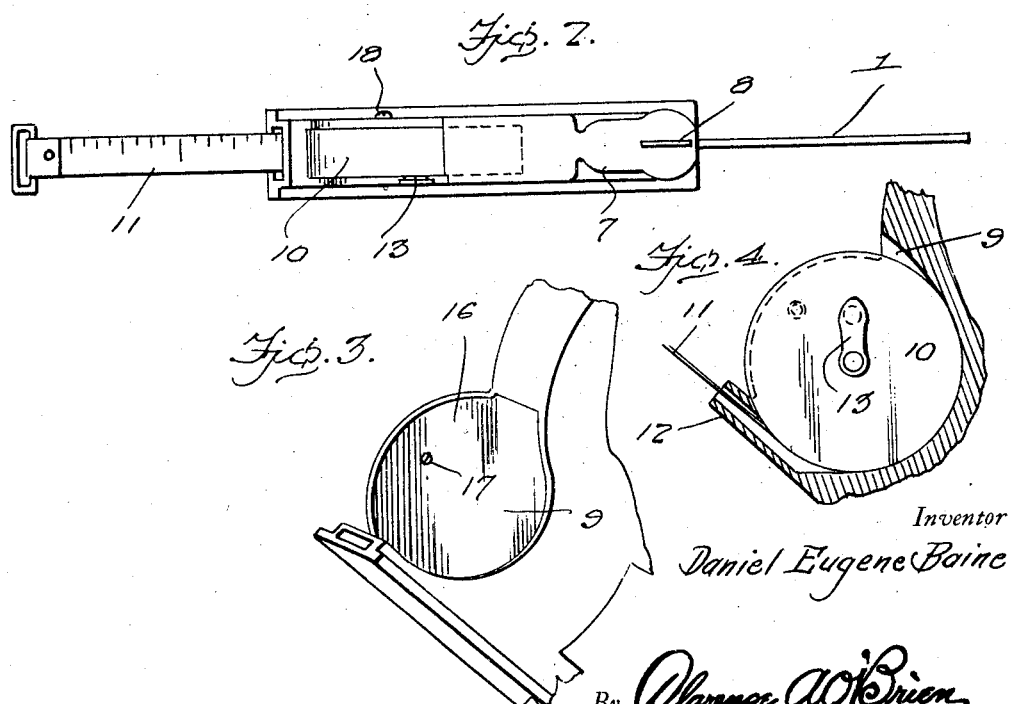
Inventor
Daniel Eugene Baine
By Clarence A. O'Brien
Attorney Patented Nov. 6, 1928.

1,690,919

UNITED STATES PATENT OFFICE.

DANIEL E. BAINE, OF STOCKTON, CALIFORNIA.

MEASURING DEVICE.

Application filed June 1, 1927. Serial No. 195,704.

My present invention has to do with measuring devices, and it contemplates the provision of a superior and advantageous square adapted to carry a tape measure and one in which the parts are so relatively arranged that the device is adapted to be used to advantage with facility.

Other objects and practical advantages of the invention will be fully understood from the following description and claims when the same are read in connection with the drawing, accompanying and forming a part of this specification, in which:

Figure 1 is a side elevation of the device constituting the preferred embodiment of my invention.

Figure 2 is a top plan view of the same.

Figure 3 is a fragmentary perspective of a portion of the body in which the tape measure casing is carried.

Figure 4 is a fragmentary vertical section taken in the plane parallel to Figure 1, and illustrating the steel or other appropriate tape measure in its guide.

Similar numerals of reference designate corresponding parts in all of the views of the drawings. I have shown in Figures 1 and 2, a rule 1, bearing a foot or other appropriate scale $2^x$, and I also illustrate in Figures 1 and 2, the mounting of the body 2 of my improvement on the rule 1. The rule 1 is longitudinally grooved as designated by 3 and the lower portion of the body 2 is designed to straddle the rule 1 and one of the walls of the bifurcation is provided on its inner side with a tongue, which is disposed and slidable in the groove 3 and is designed to prevent disengagement of the body 2 from the rule 1, in a direction at right angles to the length of the rule 1. For the purpose of adjustably fixing the body 2 to the rule 1, the said body 2 is equipped with a set screw 4, said set screw 4 having its end disposed in the opening 5 of the body 2 and being designed to be set against one longitudinal edge of the rule 1.

The body 2 is provided at its rear side 6, which is disposed at right angles to the longitudinal edge of the rule 1, with a scale measure graduated in the direction of the length of the said side 6. The scale measure referred to on the side 6 of the body 2 may be employed or may be altogether omitted, in the discretion of the manufacturer, and therefore I have not deemed it necessary to illustrate the said scale measure. I would also have it understood that while I prefer to equip the body 2 with a spirit level 7 and scriber 8, I do not desire to be understood as limiting myself to the employment of the said level 7 and scriber 8, inasmuch as they are simply preferred adjuncts of the body 2.

The side 6 of the body 2 in conjunction with the adjacent longitudinal edge of the rule 1, forms an accurate square, and in accordance with my invention, the body 2 is provided in its edge remote from the side 6, with a pocket 9, for the reception of the casing 10, of a steel or other appropriate tape measure 11, the body 2 being also provided in communication with the pocket 9, with a tubular guide 12, for the free movement of the tape 11. In general, the tape measure and its casing 10 may be and preferably are of the ordinary well known character, a handle 13 being provided for the retracting of the tape 11 into the casing 10, and one side wall of the pocket 9 being cut away as designated by 14, for the extension of the shaft 15 that carries the handle 13. The opposite side wall 16 of the pocket 9 is provided with a transverse threaded aperture 17 for the reception of a screw 18 which is designed to be set against one side of the casing 10 of the tape measure with a view to detachably though securely fastening the casing 10, in the pocket of the body 2.

It will be apparent from the foregoing that by virtue of the square 40 and the attachment of the tape measure casing 10 in fixed relation to one side of the said square, the distance of any desired point from a corner projection may be expeditiously and accurately determined.

It will also be apparent from the foregoing, that specifically considered, my improvement is advantageous inasmuch as it lends itself to the employment of an ordinary tape measure, the casing 10, being of conventional construction, by preference, and being designed to be fastened in the pockets 9 through the medium of the before mentioned screw 18.

I have entered into a detailed description of the construction and relative arrangement of the parts embraced in the present and preferred embodiment of my invention, in order to impart a full, clear and exact understanding of the said embodiment. I do not desire, however, to be understood as limiting myself to the precise construction illustrated, my invention being defined by my appended claims, within the scope of which modifications may be made, without departure from my invention.

I claim:

1. A body adapted to be attached to a rule to extend laterally therefrom and having a side edge disposed to extend at right angles to said rule and also having another edge extending at an oblique angle to the first mentioned edge and having a tape guide, said body having means for holding the casing of a tape measure, said means being in the form of a pocket having one of its side walls cut away and its other side wall provided with a transverse threaded aperture, in combination with a tape measure casing disposed in said pocket and having a tape threaded through said guide and also having rotary means at one side of its casing for the retraction of the tape, and a screw mounted in the said threaded aperture of the pocket wall and adapted to be set against the tape measure casing for the fastening of said casing in the body.

2. A rule attachment having a tape guide and means for holding the casing of a tape measure, said means being in the form of a pocket having one of its side walls cut away and its other side wall provided with a threaded aperture and a screw mounted in the said threaded aperture of the pocket wall and adapted to be set against a tape measure casing for the fastening of said casing in the attachment.

In testimony whereof I affix my signature.

DANIEL E. BAINE.